Figure 1:
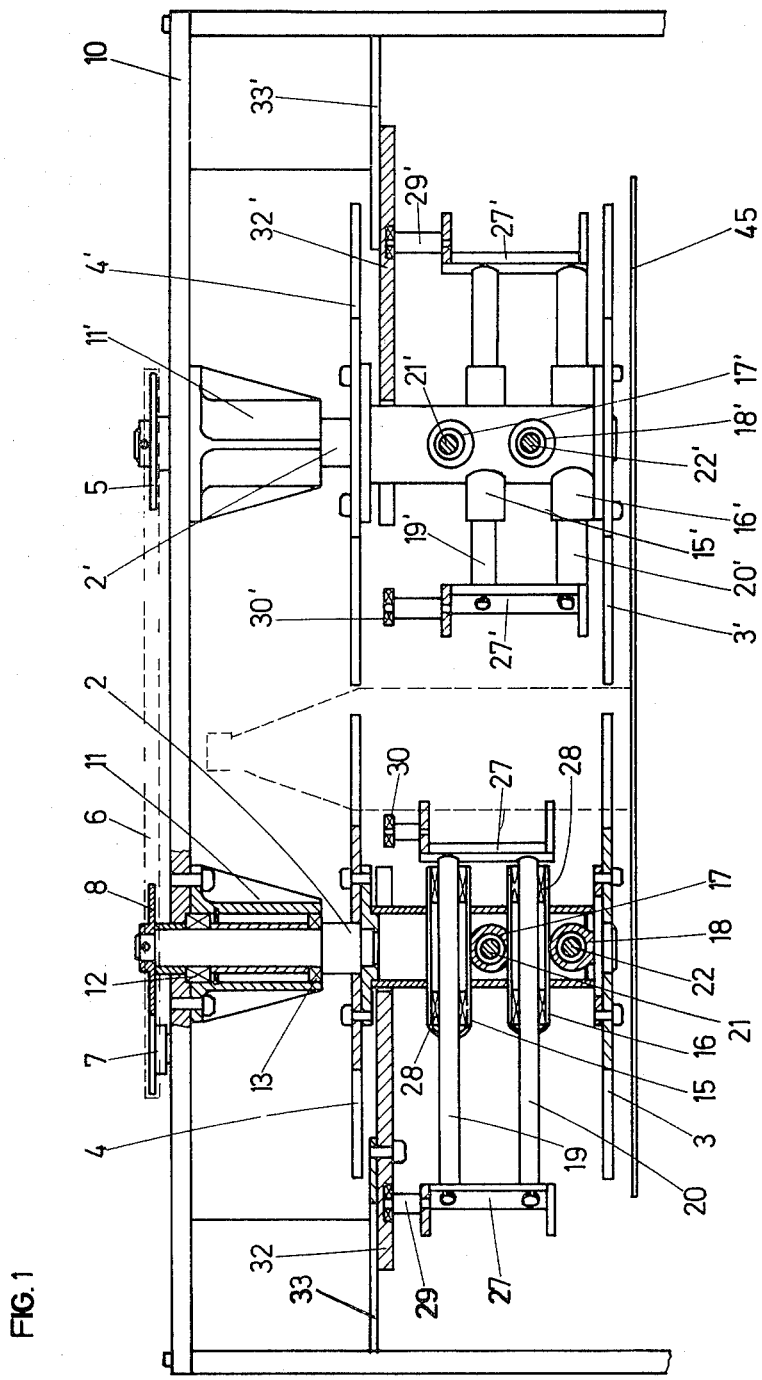

United States Patent [19]

Bauer

[11] 3,967,717

[45] July 6, 1976

[54] APPARATUS FOR DISTRIBUTING ARTICLES SUPPLIED ALONG ONE PATH TO SEVERAL PATHS

[76] Inventor: Everhard Bauer, Hudeweg 2, 479 Paderborn, Germany

[22] Filed: Jan. 13, 1975

[21] Appl. No.: 540,636

[30] Foreign Application Priority Data

Jan. 14, 1974 Germany............................ 2401587

[52] U.S. Cl............................................. 198/31 AA
[51] Int. Cl.²...................................... B65G 47/26
[58] Field of Search................ 198/31 AA, 103, 209

[56] References Cited
UNITED STATES PATENTS

| 1,326,903 | 1/1920 | Augensen........................ 198/31 AA |
| 2,273,509 | 2/1942 | Braren ............................ 198/31 AA |
| 2,827,998 | 3/1958 | Breeback ........................ 198/31 AA |
| 3,098,552 | 7/1963 | Schulz............................. 198/31 AA |

Primary Examiner—Evon C. Blunk
Assistant Examiner—Douglas D. Watts
Attorney, Agent, or Firm—Howard C. Miskin

[57] ABSTRACT

Articles that arrive in a row midway between first and second intercoupled counter-rotary star wheels at an inlet side thereof are regularly distributed among three tracks disposed at an outlet side of the star wheels. The number of teeth on each star wheel is divisible by three and the teeth of one point towards the gaps of the other and are spaced from the roots thereof to allow the arriving articles to be received in the gaps presented alternately by the wheels at the inlet side as they rotate in unison. Alternate teeth of each wheel are provided with retractable pushers for the articles, the other teeth being plain, and alternate pushers of each wheel are equipped with guide tongues. The arrangement is such that, as viewed at the position of the leading arriving article, a plain tooth of the first wheel is followed by a tooth of the second wheel that has a pusher with guide tongue, followed by a tooth of the first wheel that has a pusher without tongue, followed by a plain tooth of the second wheel, and so on, the respective pushers being retracted at the inlet side of the wheels and projected at the outlet side.

5 Claims, 2 Drawing Figures

APPARATUS FOR DISTRIBUTING ARTICLES SUPPLIED ALONG ONE PATH TO SEVERAL PATHS

The invention relates to an apparatus for distributing articles supplied along one path to several paths, comprising two coupled star wheels rotatable in opposite directions, of which the confronting teeth are relatively offset by half a tooth pitch, wherein between the crest of the tooth of one wheel and the root of the opposite wheel a spacing corresponding to the diameter of the articles is left on the center line between the shafts of the two star wheels and each star wheel is provided with movable controlled shaped members for guiding the articles to be distributed.

With such apparatus, it is possible to distribute articles from one path to two paths without jamming and tilting, even if the articles run into the apparatus at high speed and closely following one another. Such a distribution is, for example, required when articles that are individually discharged from packaging, filling or labelling machines and taken away by a conveyor in a line have to be collected as larger units for the purpose of forming packaging groups. The individual articles have to be led to juxtaposed parallel conveying paths to enable groups of the desired number and arrangement to be separated subsequently and filled into cartons or placed on trays.

A problem in the packaging industry that has not yet been solved satisfactorily consists in the distribution of articles supplied in a line in one conveying path amongst three conveying paths to enable corresponding three-row packaging units to be formed or packaging units of which the number of rows is divisible by three.

The object of the present invention is therefore to provide a high speed apparatus for distributing articles from one conveying path to three conveying paths in a simple, reliable and rapid manner.

According to the invention, this object is achieved in an apparatus of the aforementioned kind in that for distributing the articles to three paths the number of teeth of each star wheel is divisible by three, a tooth without a movable shaped member is followed by a tooth of the opposite star wheel that has a movable shaped member which is provided with a tongue engaging in the preceding tooth gap and a pusher disposed in the region of the trailing end of the tooth, that the tooth of the first star wheel following this tooth is provided at its trailing end only with a pusher, this tooth is again followed by a tooth of the opposite star wheel without a shaped member, and so on, and that the shaped members are so controlled and guided that, in the region of the outlet from the star wheels, their tongues are slid forward from the respective root towards the crest of the opposite tooth and the pushers are slid forward beyond the crest toward the opposite root and are covered by the star wheels in the region of the inlet for the articles. The articles that have been pushed by a tooth of the star wheel into the root of the opposite star wheel on entering the apparatus of the invention are pushed out again by the tongues of the shaped members to an extent such that they are apportioned to the middle of the three conveying paths amongst which the articles are to be distributed. The pushers that move over the tooth crests at the outlet move the articles disposed in the opposite root further towards the root and distribute the articles in this manner to each of the two outer paths. During each rotation of the star wheels, each of the three paths has an equal number of articles apportioned to it. With appropriately good mounting of the star wheels and the controlled shaped members, a separate drive for the star wheels can be dispensed with, so that the drive of the star wheels and the distribution of the articles will take place under the dynamic pressure of the articles supplied in a straight line in one path. The apparatus of the invention permits the distribution of articles at the highest speed, as is necessary in the packaging of industrial mass-produced goods.

Desirably, the shaped members are each fixed to the ends of push rods slidable in guide bushings passing through the star wheel shaft, the top and bottom of the shaped members being provided with slide pieces or guide rollers each of which runs in a respective stationary control cam which lies in a plane normal to the star wheel shaft and the inlet and outlet of which lies on a straight line passing through the center line of the star wheel shaft, and the spacing between the inlet and outlet corresponding to the spacing of the slide pieces or guide rollers of the shaped members fixed to one push rod. On one of the slide pieces or one guide roller entering the control cam, that or those lying opposite is or are just leaving the control cam. The control cam so reciprocates the push rod rotating with the star wheel as is necessary for the distribution of the articles to the three paths by the shaped members.

With star wheels having six teeth, each preferably has two intersecting push rods of which each carries shaped members which consist only of pushers or of tongues with pushers. The shaped members then carry out the desired distribution if the push rods by which they are carried are of appropriate arrangement and length.

The star wheels may comprise two parallel star plates fixed to the star wheel shaft. The star plates will then engage the articles to be distributed at only two positions spaced from one another, this possibly being of particular advantage when the articles are for example provided with freshly adhered labels. The control cams may be provided on two half discs disposed between the star wheel plates.

Guides for each path are desirably provided in the inlet and outlet of the star wheels so that even beyond the distributing elements according to the invention there will be efficient guiding of the articles.

Figure 2:
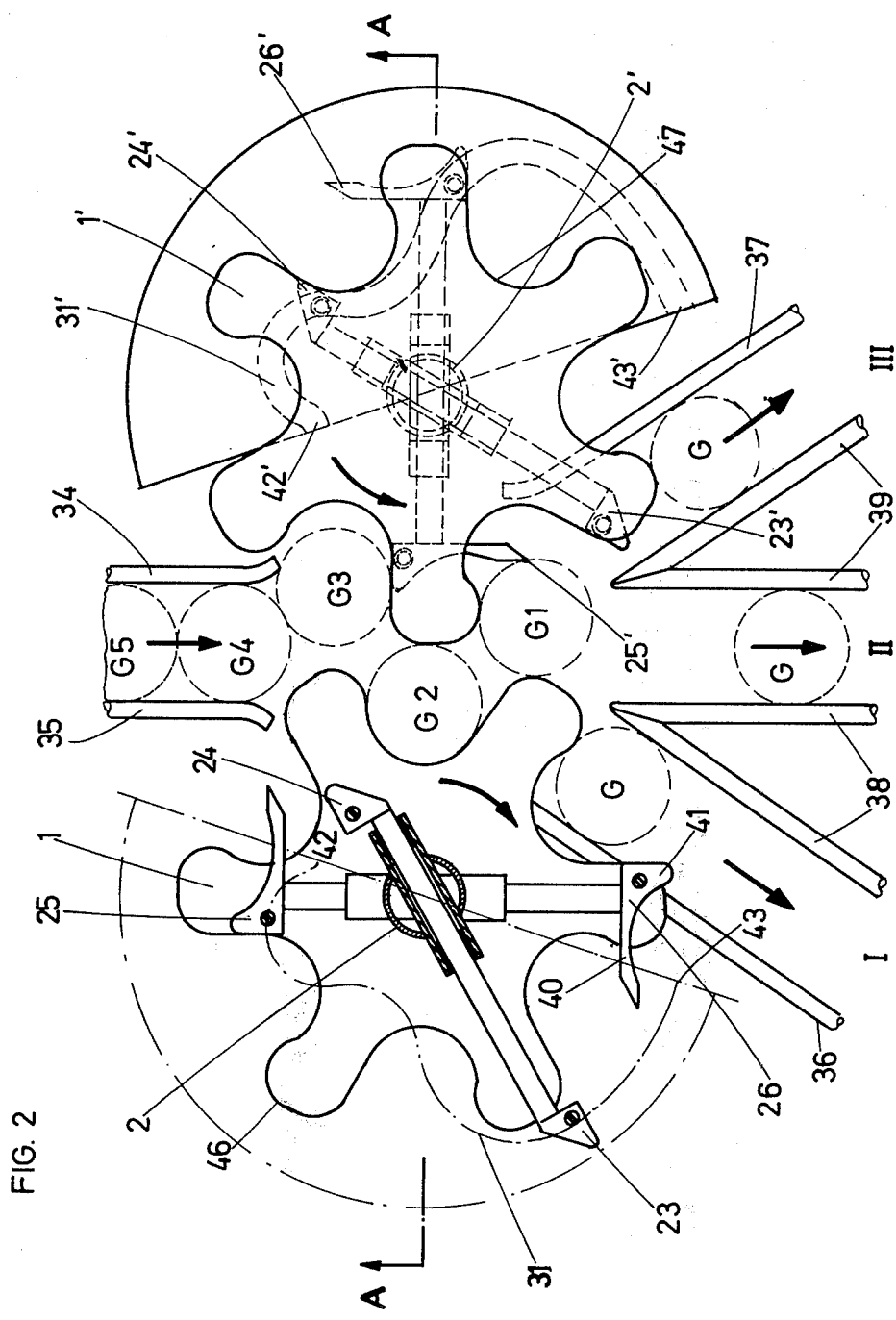

An example of the invention will hereinafter be described in more detail with reference to the drawing. In the drawing FIG. 1 is a section through the distributing apparatus on the line A—A in FIG. 2, and FIG. 2 is a plan view of the distributing apparatus according to FIG. 1.

The star wheels 1, 1' are fixed to the shafts 2, 2' which are mounted in the fixed frame 10. For mounting the shafts 2, 2', elongated bearing bushings 11, 11' are screwed to the frame 10 and in these bushings the shafts are rotatable through roller bearings 12, but are non-displaceable in the axial direction. The upper ends of the shafts 2, 2' are passed beyond the bearing through the frame 10 and carry the sprockets 5, 8. A further sprocket 7 is freely rotatably mounted in the frame 10 in such a way that an endless chain 6 (shown in broken line) which is passed about the sprockets 7 and 5 runs in S formation about the sprocket 8 that engages the chain 6 from the outside. In this way the shafts 2, 2' carrying the star wheels 1, 1' are coupled for counter-rotation.

Arranged on the vertically downwardly depending hollow portion of the shafts 2, 2' the star wheel plates 3, 4 and 3', 4' are arranged in parallel planes at a spacing from one another. The star wheel plates form the star wheels 1, 1'. The part of the hollow shafts 2, 2' extending between the star wheel plates 3, 4 and 3', 4' is penetrated by two pairs of bushings 15, 16 and 17, 18 (or 15', 16' and 17', 18') which are parallel to the star wheel plates 3, 4 and 3', 4'. Each pair of bushings is arranged at a parallel spacing vertically above one another. Both pairs of bushings intersect at the center line of the shafts 2, 2', both pairs including an angle between one another that corresponds to the pitch of the star wheel. Push rods 19, 20 and 21, 22 (or 19', 20' and 21', 22') are slidingly guided in the bushings.

The pushers 23, 24, and 23', 24' are arranged at the end of the push rods 19, 20, and 21', 22', whilst the shaped members 25, 26 and 25', 26' are connected to the ends of the pushers 21, 22 and 19', 20'. The pushers or shaped members are formed by the cross-members 27, 27' which are interconnected by the parallel rods and carry at their ends plates which correspond to the shape of the pusher or shaped member. To reduce the friction of the push rods in the guide bushings, slide rings 28 are provided in the latter. Fixed to the upper pusher or shaped member plates there are vertically upstanding pins 29, 29' which carry rotatable guide rollers 30, 30' at their free ends. These guide rollers glide in the guide cams 31, 31' formed in the members 32, 32' of half disc shape. The members of half disc shape lie between the star plates and are fixed to the frame 10 through supporting members 33, 33'.

The pushers 23, 24 or 23', 24' consist of shaped members which are substantially triangular in plan view. The shaped members 25, 26 or 25', 26' are formed of an elongated narrow tongue-shaped member 40 as viewed in plan, which recedes in step form behind the pusher member 41.

The spacing between the inlet 43, 43' and the outlet 42, 42' of the control cams 31, 31' corresponds to the spacing of the guide rollers 30, 30' on each pair of push rods so that as one guide roller enters the control cam the opposite guide roller runs out of the control cam. The inlet 43, 43' and the outlet 42, 42' of the control cams as well as the guide rollers 30, 30' of a pair of push rods are disposed on straight lines which pass through the center line of the shafts 2, 2'. This ensures trouble-free entry and exit of the guide rollers with respect to the control cams.

Guides 34 to 39 are provided for the entry of the articles to be distributed and for their exit.

As the articles G pass through the distributing apparatus, they slide along the table plate 45 by which they are carried. The distributing apparatus is suspended above this table plate 45. Instead of the table plate 45, a conveyor belt may be provided to carry the articles G to be distributed.

For the sake of clarity, the bearings for the shafts 2, 2' have been cut away in FIG. 2. Further, the lefthand portion of FIG. 2 is illustrated as a section taken below the control cam 31. The disposition of the control cam is indicated by a chain-dotted line.

The function of the apparatus will now be described in more detail with reference to FIG. 2. The articles G enter the distributing apparatus along the track bounded by the guides 34, 35 under the pressure of the subsequent articles. A respective tooth 46 pushes them into the opposite root 47. The distribution of the articles G amongst the three paths I, II and III takes place after the articles have passed the line plane containing the rotary axes of the shafts 2, 2'. The article $G_1$ is pushed out of the root by the tongue portion 40 of the shaped member 25' and is led to the central path II by the shaped member 25' which simultaneously serves as a guide. At this time the shaped member is advanced by the push rod, which is driven by the guide rollers sliding in the control cam 31', but only to such an extent that the article $G_1$ can freely enter the central path II.

The article $G_2$ is subsequently pushed towards the path I by the pusher member 41 which is provided on the shaped member 25' and projects beyond the crest of the tooth, and thus this article can readily enter the path I.

The article $G_3$ is then pushed into the path III by the pusher 24 in an analogous manner. The subsequent articles, such as 64, 65 and the next following article (not shown) are then analogously distributed amongst the paths I, II and III. In the illustrated example the articles to be distributed consist of blown plastics bottles. During tests, two-liter bottles could be efficiently distributed at a speed of 500 per minute.

I claim:

1. Apparatus for uniformly distributing articles arriving in a supply lane uniformly amongst three discharge lanes, comprising juxtaposed first and second similar star wheels mounted for rotation about rotary axes disposed in a common vertical plane, each said star wheel having a number of teeth that are divisible by three, with the teeth being of equal lengths and disposed at regular circumferential intervals to define similar radially outwardly open pockets between one another, in each of which one said article can be received, coupling means operatively connecting the star wheels for rotation in unison in opposite directions, the relative rotary position of the star wheels being set so that the crest of a first tooth on said first wheel when disposed in said common plane lies opposite the pocket formed between first and second teeth of said second wheel, stationary guide means effective to lead said arriving articles to an inlet bight defined by the star wheels, whereby said arriving articles enter successive said pockets offered to said inlet bight during rotation of the star wheels and are urged towards the bottom of the pockets by the crests of the respective opposingly disposed teeth, stationary guide means defining juxtaposed entrances to said three discharge lanes adjacent an outlet bight formed by said star wheels, the central of said entrances being located midway between said star wheels and the outside of said entrances being disposed adjacent respective said star wheels, a pusher member associated with each of said first tooth of said first star wheel, a second preceding tooth of said first star wheel, said first tooth of said second star wheel and a third following tooth of said second star wheel, each of said pusher members being disposed adjacent the trailing edge of its associated tooth and being mounted for reciprocation between a position at which it is retracted radially inwardly behind the crest of the associated tooth when disposed at said inlet bight to a position at which it is projected radially outwardly beyond the crest of the associated tooth when disposed at said outlet bight, whereby said pusher members are effective to urge the articles from opposite pockets into respective said outside entrances, an ejector tongue carried by said pusher member associated with said first tooth of said first wheel and by said pusher member associated with said third tooth of said second wheel, each of said ejector tongues being directed towards the respective preceding pocket and being movable with the pusher member by which it is carried so as to be displaceable from a position at which it is retracted radially inwardly from the bottom of said preceding pocket to a position at which it ejects the article from said preceding pocket towards said central entrance, and control means for synchronizing reciprocation of said pusher members with the rotary motion of said star wheels.

2. The apparatus of claim 1, wherein each said star wheel comprises six teeth of which only four are associated with said pusher members which are carried at both ends of two slide rods, each pusher member of only one of said slide rods carrying a said ejector tongue.

3. The apparatus of claim 1, wherein said pusher members are carried by slide rods displaceable in bushings which extend radially with respect to said rotary axes and wherein said control means comprise a cam track provided in a stationary cam plate which is associated with each star wheel and which extends normal to the rotary axis thereof, cam followers provided on the pusher members being engaged with a respective said cam track.

4. The apparatus of claim 1, wherein each star wheel is formed by a pair of parallel star wheel plates secured at a spacing from one another to a rotary shaft.

5. The apparatus of claim 3, wherein each star wheel is formed by a pair of parallel star wheel plates secured at a spacing from one another to a rotary shaft and wherein said associated cam plate is disposed between and parallel to said star wheel plates.

* * * * *